(12) United States Patent
Wang et al.

(10) Patent No.: US 9,191,168 B2
(45) Date of Patent: Nov. 17, 2015

(54) METHOD AND APPARATUS FOR APERIODICALLY TRANSMITTING SOUNDING REFERENCE SIGNAL

(71) Applicant: FUJITSU LIMITED, Kawasaki-shi, Kanagawa (JP)

(72) Inventors: Jian Wang, Beijing (CN); Yi Wang, Beijing (CN); Haibo Xu, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 13/658,100

(22) Filed: Oct. 23, 2012

(65) Prior Publication Data

US 2013/0044716 A1 Feb. 21, 2013

Related U.S. Application Data

(63) Continuation of application No. PCT/CN2010/072324, filed on Apr. 29, 2010.

(51) Int. Cl.
*H04L 12/40* (2006.01)
*H04L 5/00* (2006.01)

(52) U.S. Cl.
CPC ............ *H04L 5/0048* (2013.01); *H04L 5/0094* (2013.01)

(58) Field of Classification Search
CPC .................................................. H04W 72/04
USPC ................. 370/310–350, 477, 480, 496, 522, 370/437–439
See application file for complete search history.

(56) References Cited

U.S. PATENT DOCUMENTS

| 2009/0181691 | A1 | 7/2009 | Kotecha et al. | |
| 2012/0263129 | A1* | 10/2012 | Noh et al. | 370/329 |
| 2014/0036859 | A1* | 2/2014 | Ekpenyong et al. | 370/330 |

FOREIGN PATENT DOCUMENTS

| CN | 101272608 | 9/2008 |
| CN | 101431370 | 5/2009 |
| CN | 101436892 A | 5/2009 |
| CN | 101617489 A | 12/2009 |
| EP | 2 205 018 A1 | 7/2010 |
| JP | 2009-060596 A | 3/2009 |

(Continued)

OTHER PUBLICATIONS

Noh et al, U.S. Appl. No. 61/310,712.*

(Continued)

*Primary Examiner* — Ricky Ngo
*Assistant Examiner* — Wei-Po Kao
(74) *Attorney, Agent, or Firm* — Myers Wolin, LLC

(57) ABSTRACT

A method and apparatus that includes configuring the parameters of the sounding reference signal for the channel which is to be detected by a user device, in order to allocate the resource of the sounding reference signal for the user device; transmitting the information, which includes the sounding reference signal resource allocated to the user device, to the user device through a high layer signaling; and transmitting an activation signal to the user device through a low layer signaling to activate the user device to transmit the sounding reference signal. Therefore, an activation signal is transmitted to the user device by transmitting a low layer signaling with higher speed, thus the use efficiency of the resource of the sounding reference signal of the system can be improved, and more users can be supported by the system.

8 Claims, 5 Drawing Sheets

(56) References Cited

FOREIGN PATENT DOCUMENTS

| | | |
|---|---|---|
| JP | 2013-519288 A | 5/2013 |
| KR | 10-2008-0112115 A | 12/2008 |

OTHER PUBLICATIONS

Ekpenyong et al, U.S. Appl. No. 61/293,915.*

Notice of Reason for Refusal issued for corresponding Japanese Patent Application No. 2013-506438, mailed on Feb. 12, 2014, with an English translation.

International Search Report issued for corresponding International Patent Application No. PCT/CN2010/072324, mailed Dec. 23, 2010.

Notice of Preliminary Rejection issued for corresponding Korean Patent Application No. 10-2012-7028083, issued on Feb. 28, 2014, with an English translation.

Office Action issued for corresponding Canadian Patent Application No. 2,797,249, dated on Aug. 19, 2014.

Notification of the First Office Action issued for corresponding Chinese Patent Application No. 201080066432.2, issued on Aug. 27, 2014, with an English translation.

ASUSTeK, "Discussion on Dynamic Aperiodic Sounding", Agenda Item: 7.4.2, Feb. 22-26, 2010, R1-100997, 3GPP TSG RAN WG1 Meeting #60, 3GPP, San Francisco, CA (US).

Panasonic, "SRS enhancement for LTE-Advanced", Agenda Item: 6.5.2, Apr. 12-16, 2010, 3GPP TSG RAN WG1 Meeting #60bis, R1-102040, 3GPP, Beijing, China.

Extended European search report with supplementary European search report and the European search opinion issued by the European Patent Office for corresponding European Patent Application No. 10850486.1, mailed on Aug. 27, 2015.

Motorola, "Aperiodic SRS for LTE-A", Agenda Item: 6.5.2, 3GPP TSG-RAN WG1 Meeting #60bis, R1-102114, Beijing, China, Apr. 12-16, 2010.

* cited by examiner

METHOD AND APPARATUS FOR APERIODICALLY TRANSMITTING SOUNDING REFERENCE SIGNAL

CROSS-REFERENCE TO RELATED APPLICATIONS

The present application is a continuation of PCT Application No. PCT/CN2010/072324, filed on Apr. 29, 2010, the contents of which are herein wholly incorporated by reference.

FIELD OF THE INVENTION

The present invention relates to the field of a wireless communication system, and in particular, to a method and apparatus for transmitting a Sounding Reference Signal (SRS) a periodically in a wireless communication system.

BACKGROUND OF THE INVENTION

In the Fourth Generation (4G) mobile communication system, a Reference Signal (RS) is utilized to perform data demodulation and channel sounding in an uplink of Single Carrier Frequency Division Multiple Access (SC-FDMA) for Long Term Evolution (LTE), for example.

The functions of the uplink RS include channel estimation required for performing coherent demodulation, channel quality sounding for uplink scheduling, power control, timing estimation, arriving direction estimation for supporting downlink beam forming, and the like.

The uplink RS in the LTE is mostly based on the Zadoff-Chu (ZC) sequence. The ZC sequence is also called GCL (Generalized Chirp-Like) sequence. This sequence is a non-binary unit amplitude sequence, which meets CAZAC (Constant Amplitude Zero Autocorrelation) characteristic. The CAZAC sequence is a complex value signal in the form of $e^{j\alpha_k}$. The ZC sequence with a length being a prime number of $N_{ZC}$ may be represented as:

$$a_q = \exp\left[-j2\pi q \frac{n(n+1)/2 + \ln}{N_{ZC}}\right],$$

where $q \in \{1, \ldots, N_{ZC}-1\}$ is the root index of the ZC sequence, and $n = 0, 1, \ldots, N_{ZC}-1$, $l \in N$. For simplicity, it is set that $l = 0$ in the LTE.

The ZC sequence has characteristics as follows.

1. The ZC sequence has a constant amplitude, and still has a constant amplitude after DFT operation. The characteristic of constant amplitude limits the peak to average power ratio and the boundary and time flat interference on other users. Additionally, this characteristic simplifies the implementation when only the phase instead of the amplitude needs to be calculated and stored.

2. The ZC sequence with any length has ideal cyclic autocorrelation, which means that the cyclic shift correlation is a δ function.

Due to the ideal characteristics of the ZC sequence, the uplink RS has excellent characteristics as follows. (1) The amplitude is constant in the frequency field, which is for performing same activation on all of the allocated sub-carriers in the unbiased channel estimation. (2) The value of low Cubic Measurement (CM) is relatively low in the time field. (3) The autocorrelation characteristic is excellent, which facilitates accurate channel estimation. (4) The cross correlation characteristic is excellent, thereby reducing the interference of the RS transmitted over the same resource from other cells.

The uplink supports two kinds of RS. The first kind of RS is Demodulation RS (DMRS). This kind of RS mainly is used to perform channel estimation for uplink data transmission or signaling information transmission, and further to perform related detection. The second kind of RS is Sounding RS (SRS). This kind of RS mainly is used to perform channel quality measurement, thereby performing frequency selective scheduling for uplink.

In the LTE system, as shown in FIG. 1, a subframe is of 14 symbols numbered 0, 1, 2, ..., 13, respectively. In the Rel.8/9 system, the SRS signal of the user can only be transmitted in the symbol No. 13. In the Rel.8/9 system, the DMRS signal of the user can only be transmitted in the symbols No. 3 and No. 10. The DMRS and SRS signals for uplink are time division multiplexed with data symbols. The DMRS for a specific User Equipment (UE) is of the same bandwidth as that of the Physical Uplink Shared Channel (PUSCH) or Physical Uplink Control Channel (PUSCH) transmitted by the UE, e.g. the PUSCH bandwidth in the whole cell bandwidth. Therefore, when the various bandwidths of the system are allocated to the various users (for FDMA), the DMRS for respective users are orthogonal to one another.

The SRS bandwidth for the user may be different from the bandwidth for data transmission. The SRS signal for the user is always transmitted over the last SC-FDMA symbol in the subframe, and the parameters of the SRS signal are notified by a high layer signaling. In FIG. 1, the UE transmits the SRS periodically over the last symbol in the subframe. In FIG. 2, the SRS signal is multiplexed through Frequency Division Multiplexing (FDM), Code Division Multiplexing (CDM), or Time Division Multiplexing (TDM). In the TDM, the eNodeB in the LTE requires s single SRS transmission from the UE or configures the UE to transmit the SRS periodically until the end. If a UE transmits the SRS periodically, the period may be 2, 5, 10, 20, 40, 80, 160, or 320 ms. In the FDM, the eNodeB may allocate the frequency resource with different bandwidth or the frequency resource with same bandwidth but with different location to the user for transmitting the SRS signal. The factors affecting the SRS bandwidth include the UE maximum power, the number of UEs supportable for detecting, and the detecting bandwidth required for benefit from uplink scheduling dependent on channel conditions. In the CDM, the eNodeB may also allocate the frequency resource with same bandwidth and with same location to different users. At this time, the different cyclic shift of the RS sequence may be used to implement the orthogonal sequence. That is, the correlation between a ZC sequence and any cyclic shift of the same sequence is zero. When the length of the channel impulse response is finite, different transmitters may use different cyclic time shifts of the same RS base sequence. As long as the cyclic shift is longer than the channel impulse response, the orthogonality may be maintained among the RSs.

Except for the TDM, FDM, and CDM above, there is no any other implementation for multiplexing of SRS resource in the current LET system.

In the LTE system, the transmission of the uplink signal of the user supports the mode of single antenna transmission or antenna selection transmission. Only a set of SRS resource is allocated to every user when the SRS resource is allocated.

In the LTE-Advanced system, in order to meet a higher uplink transmission rate index, it is required that the UE supports higher rank, e.g. rank1-rank4, of transmission on uplink. Thus, it is required that the UE is equipped with a higher number of antennas. For example, two antennas are equipped to support transmission of up to rank2, or four antennas are equipped to support transmission of up to rank4.

When the UE is equipped with a higher number of antennas to thereby perform higher rank of transmission, more SRS resources need to be allocated so as to perform detection and estimation on the channel of each of the antennas.

Therefore, additional methods should be adopted to further improve the capacity of the SRS.

The methods for improving the capacity of the SRS may be classified into two basic aspects. The first aspect is to improve the available resource of the SRS, and the other aspect is to improve the usage of the current SRS resource.

As described above, the parameters of the SRS signal are notified by a high layer signaling of the system, and then the SRS signal is activated and transmitted in a given period after the notification. This is a procedure for periodical transmission of the SRS signal. And, the deactivation of the SRS signal is notified by the high layer signaling of the system. Therefore, at present, the use of the SRS signal by the system, from the activation procedure to the deactivation procedure, has to be notified by the high layer signaling. The notification by the high layer signaling is a relatively slow procedure, and therefore the usage of the SRS resource of the system is relatively low.

The present invention is directed to employ the SRS resource with high efficiency, so that the system can support more users.

SUMMARY OF THE INVENTION

Hereinafter, there is provided a brief summary about the present invention in order to provide a basic understanding on certain aspects of the invention. However, it should be understood that this summary is not an exhaustive summary about the invention. It is not intended to determine critical portions or important portions of the invention, nor does it intend to limit the scope of the invention. The object thereof is only to propose some concepts with respect to the invention in a simplified form, thereby to be a prelude of the more detailed description given later.

In light of above situations in the prior art, an object of the invention is to provide a method and apparatus for transmitting a sounding reference signal aperiodically in a wireless communication system, which can overcome the shortcomings and deficiencies in the prior art above to improve the use efficiency of the resource of the sounding reference signal of the system, so that the system can support more users.

To achieve the above object, according to an aspect of the invention, there is provided a method for transmitting a sounding reference signal aperiodically in a wireless communication system including: configuring parameters of the sounding reference signal for a channel to be sounded by a user equipment so as to allocate resources of the sounding reference signal to the user equipment; transmitting, through a high layer signaling, information containing the resources of the sounding reference signal allocated to the user equipment to the user equipment; and transmitting, through a low layer signaling, an activation signal to the user equipment so as to activate the user equipment to transmit the sounding reference signal.

According to another aspect of the invention, there is further provided an apparatus for transmitting a sounding reference signal aperiodically in a wireless communication system including: a configuration unit that configures parameters of the sounding reference signal for a channel to be sounded by a user equipment so as to allocate resources of the sounding reference signal to the user equipment; a configuration signaling transmission unit that transmits, through a high layer signaling, information containing the resources of the sounding reference signal allocated to the user equipment to the user equipment; and an activation signaling transmission unit that transmits, through a low layer signaling, an activation signal to the user equipment so as to activate the user equipment to transmit the sounding reference signal.

According to another aspect of the invention, there is further provided a wireless communication system including a base station and a user equipment, wherein the base station includes the apparatus for transmitting a sounding reference signal aperiodically as described above, and the user equipment includes a signaling reception unit that receives a high layer signaling and a low layer signaling from the base station.

According to another aspect of the invention, there is further provided a computer program product for implementing the method for transmitting a sounding reference signal aperiodically in a wireless communication system above.

According to another aspect of the invention, there is further provided a machine-readable storage medium on which computer program codes for implementing the method for transmitting a sounding reference signal aperiodically in a wireless communication system above is carried.

In the technical solution of the invention mentioned above, the resources of the sounding reference signal are allocated to the user equipment through the high level signaling, and the user equipment is activated through the low level signaling to transmit the sounding reference signal. Thus, the activation signal is transmitted to the user equipment through the low level signaling with a relatively high speed of transmission, which can improve the use efficiency of the resource of the sounding reference signal of the system, so that the system can support more users.

BRIEF DESCRIPTION OF THE DRAWINGS

The invention can be better understood by referring to the detailed description given hereinafter in combination with the accompany drawings in which identical or similar components are denoted by identical or similar reference numbers. The accompany drawings together with the detailed description below are included in the specification and form parts of the specification for further illustrating preferred embodiments of the invention and explaining principles and advantages of the invention by way of example. Wherein.

Figure 1:
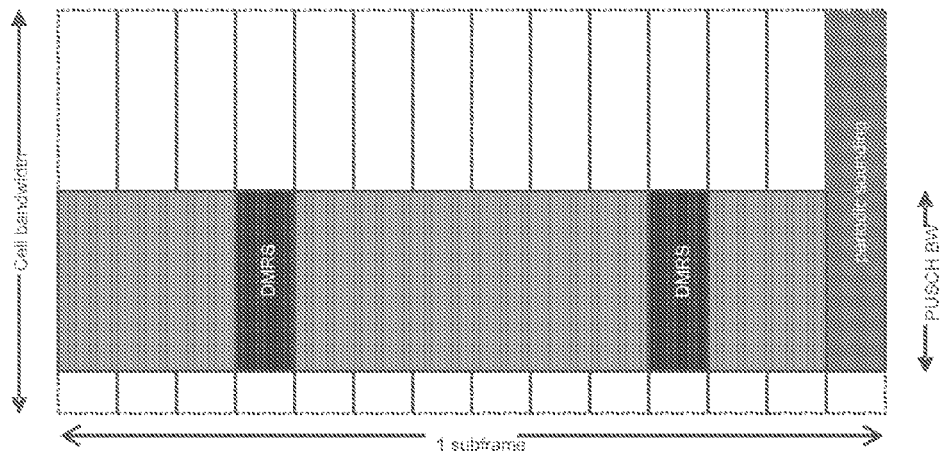
FIG. 1 is a schematic diagram illustrating a subframe for transmitting an uplink sounding reference signal in the prior art.
Figure 2:
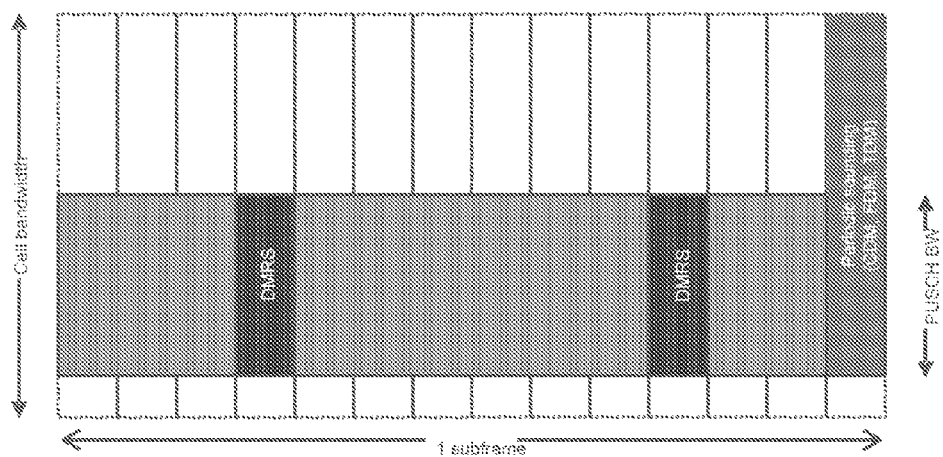
FIG. 2 is a schematic diagram illustrating an another subframe for transmitting an uplink sounding reference signal in the prior art.

Those skilled in the art should understand that elements in the drawings are only shown for the purpose of simplicity and clarity, and are not necessarily drawn to scales. For example, sizes of certain elements in the drawings may be enlarged relative to other elements so that it is helpful to improve the understanding on the embodiments of the invention.

DETAILED DESCRIPTION OF THE INVENTION

Hereinafter, an exemplary embodiment of the invention will be described in combination with the drawings. For the purpose of clarity and simplicity, not all the features of the actual embodiment are described in the specification. However, it should be appreciated that it has to make a lot of decisions specific to the embodiments during a process for developing any such actual embodiments in order to achieve specific targets of developers, for example, complying with those restrictive conditions related to systems and operations, and these restrictive conditions may vary with different embodiments. Further, it should also be appreciated that although developing work may be very complex and time-consuming, such developing work is merely a routine task for those skilled in the art who benefit from the present disclosure.

Herein, there is still one point needed to be illustrated that, for preventing unnecessary details from obscuring the invention, only the device structures and/or processing steps closely related to the scheme according to the invention are shown in the drawings, and other details having little to do with the invention are omitted.

The method and apparatus for transmitting a sounding reference signal aperiodically in a wireless communication system according to the embodiment of the invention is described in detail with reference to the drawings in the following.

Figure 5:
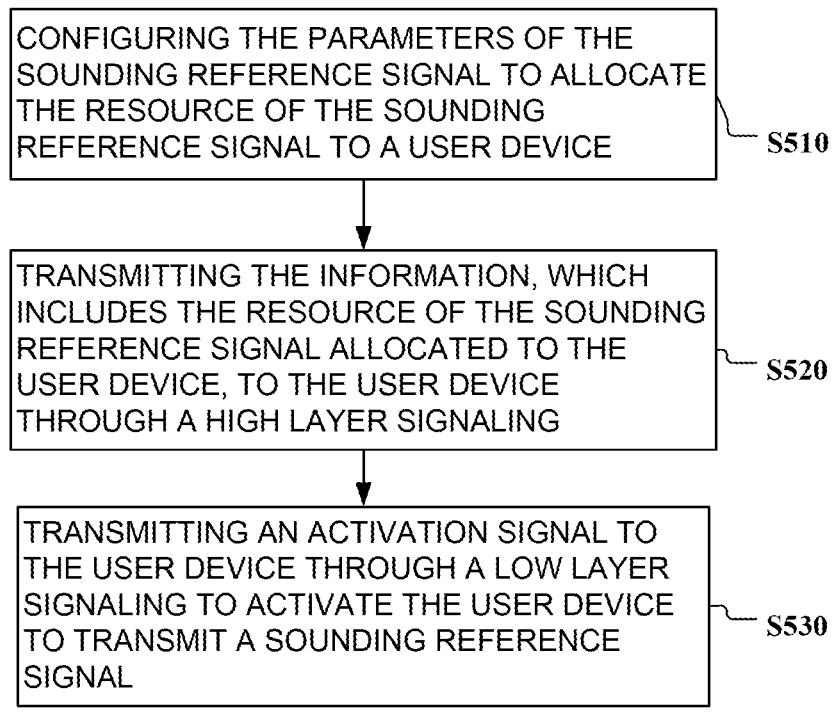
FIG. 5 is a flow chart illustrating a method for transmitting a sounding reference signal aperiodically in a wireless communication system according to the embodiment of the invention.

FIG. 5 is a flow chart illustrating a method for transmitting a sounding reference signal aperiodically in a wireless communication system according to the embodiment of the invention.

As shown in FIG. 5, firstly, in step S510, parameters of the sounding reference signal are configured for a channel to be sounded by a user equipment so as to allocate resources of the sounding reference signal to the user equipment.

According to the embodiment of the invention, the parameters of the sounding reference signal which shall be configured may include frequency resource of the user equipment, code division resource of the user equipment, the number of times that the sounding reference signal being transmitted when the user equipment is activated, and a corresponding bit position of the user equipment in a low layer signaling for activating the user equipment to transmit the sounding reference signal.

Next, in step S520, information containing the resources of the sounding reference signal allocated to the user equipment is transmitted to the user equipment through a high layer signaling.

According to the embodiment of the invention, the high layer signaling for transmitting the information containing the resources of the sounding reference signal allocated to the user equipment to the user equipment may include a Radio Resource Control (RRC) signaling. The high layer signaling such as the RRC signaling according to the embodiment of the invention is responsible for only notifying the user equipment of the resources of the allocated sounding reference signal without activating the user equipment to transmit the sounding reference signal, which is different from that in the prior art.

At last, in step S530, an activation signal is transmitted to the user equipment through a low layer signaling so as to activate the user equipment to transmit the sounding reference signal.

According to the embodiment of the invention, the low layer signaling for activating the user equipment to transmit the sounding reference signal may include PDCCH (Physical Downlink Control Channel) signaling. When the user equipment receives the low layer signaling such as the PDCCH signaling, the user equipment is activated, and starts to transmit the sounding reference signal in accordance with the information containing the resources of the sounding reference signal allocated to the user equipment transmitted through the high layer signaling such as the RRC signaling received in step S520.

As described above, in step S510, the parameters of the sounding reference signal have been configured for the channel to be sounded by the user equipment, in which the number of times that the sounding reference signal being transmitted when the user equipment is activated and a corresponding bit position of the user equipment in the low layer signaling such as the PDCCH signaling for activating the user equipment to transmit the sounding reference signal are included.

According to the embodiment of the invention, the low layer signaling such as the PDCCH signaling for activating the user equipment to transmit the sounding reference signal may activate one user equipment at one time, or may activate a plurality of user equipments at one time. In a case that a plurality of user equipments are activated at one time, the plurality of user equipments correspond to different bit positions from each other in the low layer signaling such as the PDCCH signaling.

According to the embodiment of the invention, the number of times that the sounding reference signal being transmitted when the user equipment is activated is preset, which may be one time, or may be a plurality of times. According to the embodiment of the invention, the user equipment automatically stops transmitting the sounding reference signal when the number of times that the sounding reference signal being transmitted when the user equipment is activated reaches a preset number. That is, deactivation of the sounding reference signal needs no additional signaling.

Figure 3:
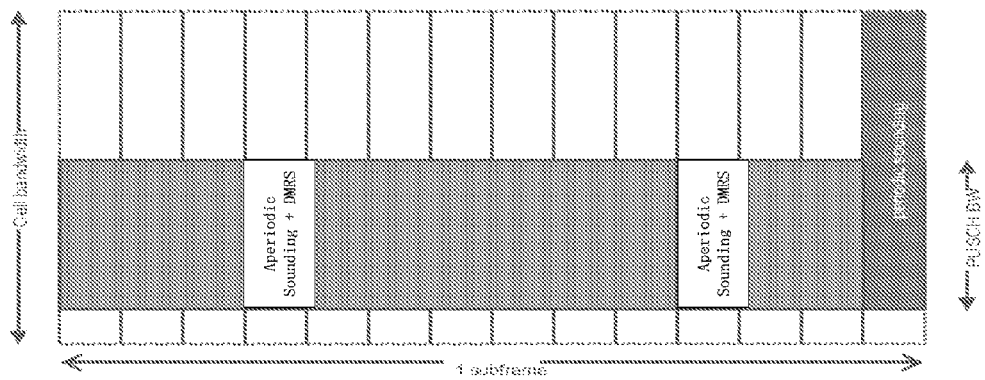
FIG. 3 is a schematic diagram illustrating a subframe for transmitting an uplink sounding reference signal according to an embodiment of the invention.
Figure 4:
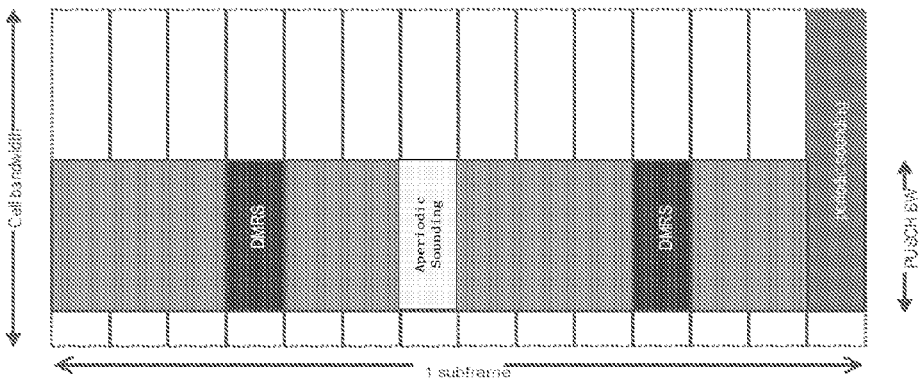
FIG. 4 is a schematic diagram illustrating an another subframe for transmitting an uplink sounding reference signal according to the embodiment of the invention.

According to the embodiment of the invention, when the user equipment is activated to transmit the sounding reference signal, the user equipment may employ various resources to transmit the sounding reference signal, as shown in FIGS. 3 and 4. FIG. 3 is a schematic diagram illustrating a subframe for transmitting an uplink sounding reference signal according to an embodiment of the invention, and FIG. 4 is a schematic diagram illustrating an another subframe for transmitting an uplink sounding reference signal according to the embodiment of the invention. In FIG. 3, the user equipment transmits the sounding reference signal by employing at least one of the last symbol in a subframe for transmitting the sounding reference signal periodically in the prior art, the third symbol in the subframe for transmitting a demodulation reference signal in the prior art, and the tenth symbol in the subframe for transmitting the demodulation reference signal in the prior art. Alternatively, in FIG. 4, the user equipment transmits the sounding reference signal by employing the sixth symbol in the subframe. In fact, according to the embodiment of the invention, the user equipment may transmit the sounding reference signal by employing one of the zeroth, first, second, fourth, fifth and sixth symbols in the subframe.

Figure 6:
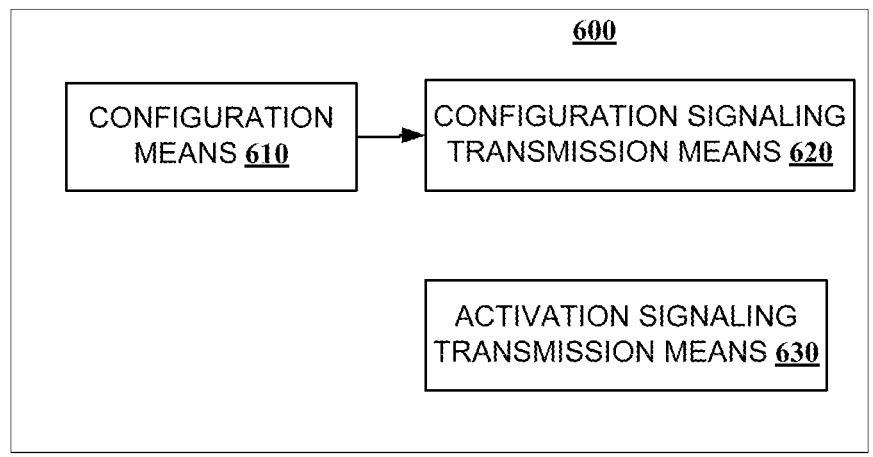
FIG. 6 is a block diagram illustrating an apparatus for transmitting a sounding reference signal aperiodically in a wireless communication system according to the embodiment of the invention.

Hereinafter, an apparatus for transmitting a sounding reference signal aperiodically in a wireless communication system according to the embodiment of the invention is further described in detail in conjunction with the drawings. FIG. 6 is a block diagram illustrating an apparatus 600 for transmitting a sounding reference signal aperiodically in a wireless communication system according to the embodiment of the invention.

As shown in FIG. 6, the apparatus 600 according to the embodiment of the invention includes a configuration unit 610, a configuration signaling transmission unit 620, and an activation signaling transmission unit 630.

The configuration unit 610 is adapted to configure parameters of the sounding reference signal for a channel to be sounded by a user equipment so as to allocate resources of the sounding reference signal to the user equipment.

The configuration signaling transmission unit 620 is adapted to transmit, through a high layer signaling, information containing the resources of the sounding reference signal allocated to the user equipment to the user equipment.

The activation signaling transmission unit 630 is adapted to transmit, through a low layer signaling, an activation signal to the user equipment so as to activate the user equipment to transmit the sounding reference signal.

The various specific implementations of the respective unit above in the apparatus 600 have been described in detail previously, and therefore the explanations thereof will not be repeated herein.

Figure 7:
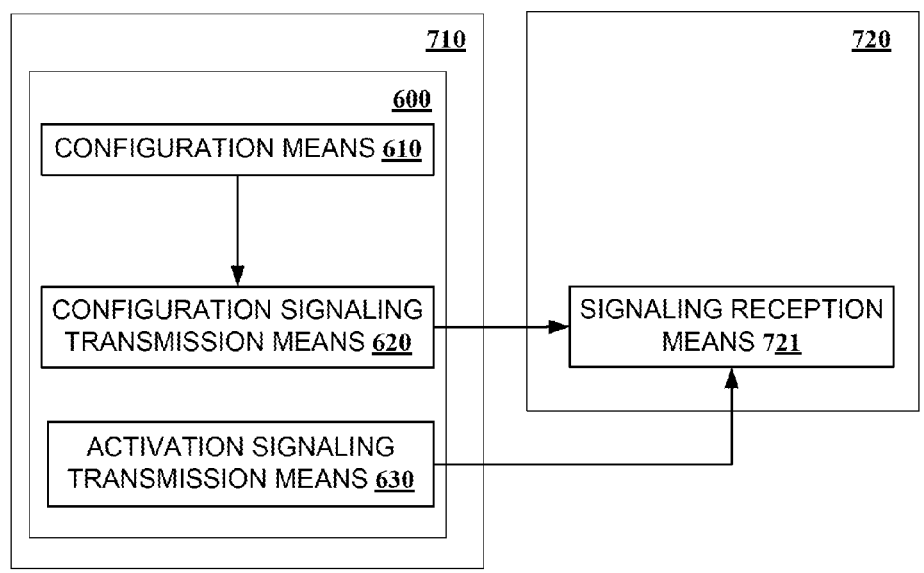
FIG. 7 is a block diagram illustrating a wireless communication system according to the embodiment of the invention.

The method and apparatus above of the invention may be used in a wireless communication system. FIG. 7 is a block diagram illustrating a wireless communication system 700 according to the embodiment of the invention.

The wireless communication system 700 includes a base station 710 and a user equipment 720. The base station 710 includes the apparatus 600 for transmitting a sounding reference signal aperiodically in the wireless communication system as shown in FIG. 6, which includes a configuration unit 610, a configuration signaling transmission unit 620, and an activation signaling transmission unit 630. The user equipment 720 includes a signaling reception unit 721 for receiving a high layer signaling and a low layer signaling from the base station 710.

According to the embodiment of the invention, the configuration unit 610 in the apparatus 600 in the base station 710 configures parameters of the sounding reference signal for a channel to be sounded by the user equipment 720 so as to allocate resources of the sounding reference signal to the user equipment 720. Then, the configuration signaling transmission unit 620 in the apparatus 600 in the base station 710 transmits, through a high layer signaling, information containing the resources of the sounding reference signal allocated to the user equipment 720 to the signaling reception unit 721 in the user equipment 720. Next, the activation signaling transmission unit 630 in the apparatus 600 in the base station 710 transmits, through a low layer signaling, an activation signal to the signaling reception unit 721 in the user equipment 720 so as to activate the user equipment 720 to transmit the sounding reference signal.

After receiving the low layer signaling transmitted by the activation signaling transmission unit 630, the user equipment 720 transmits the sounding reference signal to the base station 710 aperiodically via a signaling transmission unit (not shown) in accordance with the received information on the resources of the sounding reference signal allocated to the user equipment 720 contained in the high layer signaling transmitted by the configuration signaling transmission unit 620.

The various specific implementations of the respective apparatus or unit above in the wireless communication system 700 have also been described in detail previously, and therefore the explanations thereof will not be repeated herein.

Apparently, respective operating processes of the method above according to the invention can be implemented in a manner of a computer executable program stored on a machine-readable storage medium.

And, the object of the invention can be implemented in a manner that the storage medium on which the computer executable program above is carried is provided directly or indirectly to a system or apparatus, a computer or a Central Processing Unit (CPU) of which reads out and executes the computer executable program. Here, the implementation of the invention is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage units, a semiconductor device, a disk unit such as an optic disk, a magnetic disk and a magneto-optic disk, and other medium suitable for storing information.

Additionally, the invention can also be implemented by connecting to a corresponding web site on the Internet through a computer, downloading and installing the computer executable program according to the invention into the computer, and then executing the program.

In the apparatus and method of the invention, it is obvious that respective components or steps can be decomposed and/or recombined. Such decomposition and/or recombination should be considered as an equivalent solution of the invention. And, the steps performing a series of processing above can be performed in the describing order naturally, but this is not necessary. Some steps can be performed concurrently or independently with one another.

Although the embodiment of the invention has been described in detail in combination with the drawings above, it should be understood that, the embodiment described above is only used to explain the invention and is not constructed as the limitation to the invention. For those skilled in the art, various modification and alternation can be made to the above embodiment without departing from the essential and scope of the invention. Therefore, the scope of the invention is only defined by the appended claims and the equivalents thereof.

What is claimed is:

1. A method for transmitting a sounding reference signal a periodically in a wireless communication system, comprising:

configuring parameters of the sounding reference signal for a channel to be sounded by a user equipment so as to allocate resources of the sounding reference signal to the user equipment;

transmitting, through a high layer signaling, information containing the resources of the sounding reference signal allocated to the user equipment to the user equipment; and transmitting, through a low layer signaling, an activation signal to the user equipment so as to activate the user equipment to transmit the sounding reference signal, wherein the parameters of the sounding reference signal comprise frequency resource of the user equipment, code division resource of the user equipment, a corresponding bit position of the user equipment in the low layer signaling or a number of times that the sounding reference signal being transmitted when the user equipment is activated, and wherein the low layer signaling activates one or more user equipments at one time, and if a plurality of user equipments are activated, the plurality of user equipments correspond to different bit positions from each other in the low layer signaling.

2. The method according to claim 1, wherein the user equipment automatically stops transmitting the sounding reference signal when the number of times that the sounding reference signal being transmitted when the user equipment is activated reaches a preset number.

3. The method according to claim 1, wherein resources used for the user equipment to transmit the sounding reference signal comprise at least one of the following: a last symbol for transmitting the sounding reference signal periodically in a subframe; a third symbol for transmitting a demodulation reference signal in the subframe; a tenth symbol for transmitting the demodulation reference signal in the subframe; and one of a zeroth, first, second, fourth, fifth and sixth symbols in the subframe.

4. A non-transitory machine-readable storage medium carrying a program product, wherein the program product comprises a machine-readable instruction code stored therein, and the instruction code is capable of causing a computer to perform the method according to claim 1 when read and executed by the computer.

5. An apparatus for configuring parameters for a sounding reference signal and activating a user equipment to transmit the sounding reference signal in a wireless communication system, comprising:

a configuration unit that configures parameters of the sounding reference signal for a channel to be sounded by a user equipment so as to allocate resources of the sounding reference signal to the user equipment;

a configuration signaling transmission unit that transmits, through a high layer signaling, information containing the resources of the sounding reference signal allocated to the user equipment to the user equipment; and an activation signaling transmission unit that transmits, through a low layer signaling, an activation signal to the user equipment so as to activate the user equipment to transmit the sounding reference signal, wherein the parameters of the sounding reference signal comprise frequency resource of the user equipment, code division resource of the user equipment, a corresponding bit position of the user equipment in the low layer signaling or a number of times that the sounding reference signal being transmitted when the user equipment is activated, and wherein the low layer signaling activates one or more user equipments at one time, and if a plurality of user equipments are activated, the plurality of user equipments correspond to different bit positions from each other in the low layer signaling.

6. The apparatus according to claim 5, wherein the user equipment automatically stops transmitting the sounding reference signal when the number of times that the sounding reference signal being transmitted when the user equipment is activated reaches a preset number.

7. The apparatus according to claim 5, wherein the resources used for the user equipment to transmit the sounding reference signal comprise at least one of the following: a last symbol for transmitting the sounding reference signal periodically in a subframe; a third symbol for transmitting a demodulation reference signal in the subframe; a tenth symbol for transmitting the demodulation reference signal in the subframe; and one of a zeroth, first, second, fourth, fifth and sixth symbols in the subframe.

8. A wireless communication system comprising:

a base station and a user equipment, wherein the base station comprises an apparatus for configuring parameters for a sounding reference signal and activating a user equipment to transmit the sounding reference signal the apparatus comprises:

a configuration unit that configures parameters of the sounding reference signal for a channel to be sounded by the user equipment so as to allocate resources of the sounding reference signal to the user equipment;

a configuration signaling transmission unit that transmits, through a high layer signaling, information containing the resources of the sounding reference signal allocated to the user equipment to the user equipment; and an activation signaling transmission unit that transmits, through a low layer signaling, an activation signal to the user equipment so as to activate the user equipment to transmit the sounding reference signal, wherein the parameters of the sounding reference signal comprise frequency resource of the user equipment, code division resource of the user equipment, a corresponding bit position of the user equipment in the low layer signaling or a number of times that the sounding reference signal being transmitted when the user equipment is activated, and wherein the low layer signaling activates one or more user equipments at one time, and if a plurality of user equipments are activated, the plurality of user equipments correspond to different bit positions from each other in the low layer signaling; and the user equipment comprises a signaling reception unit that receives a high layer signaling and a low layer signaling from the base station.

* * * * *